United States Patent [19]

Volk

[11] Patent Number: 4,640,595

[45] Date of Patent: Feb. 3, 1987

[54] ASPHERIC CONTACT LENS

[76] Inventor: David Volk, 3336 Kersdale Rd., Pepper Pike, Ohio 44124

[21] Appl. No.: 606,140

[22] Filed: May 2, 1984

[51] Int. Cl.⁴ .......................... G02C 7/04; G02C 7/06
[52] U.S. Cl. ................................ 351/160 R; 351/161; 351/177
[58] Field of Search ............... 351/160 R, 160 H, 161, 351/162, 177

[56] References Cited

U.S. PATENT DOCUMENTS

| | | | |
|---|---|---|---|
| 2,544,246 | 3/1951 | Butterfield | 351/160 R |
| 2,653,515 | 9/1953 | Stimson | 351/160 R |
| 3,187,338 | 6/1965 | Neefe | 351/160 R |
| 3,218,765 | 11/1965 | Volk | 51/284 |
| 3,227,507 | 1/1966 | Feinbloom | 351/160 R |
| 3,344,692 | 10/1967 | Volk | 82/1 |
| 3,482,906 | 12/1969 | Volk | 351/160 |
| 3,535,825 | 10/1970 | Volk | 51/124 |
| 3,950,082 | 4/1976 | Volk | 351/169 |
| 4,149,801 | 4/1979 | Volk | 356/124 |
| 4,194,815 | 3/1980 | Trombley | 351/160 R |
| 4,195,919 | 4/1980 | Shelton | 351/160 R |
| 4,199,231 | 4/1980 | Evans | 351/160 H |
| 4,418,991 | 12/1983 | Breger | 351/161 |
| 4,525,043 | 6/1985 | Bronstein | 351/160 R |
| 4,580,882 | 4/1986 | Nuchman et al. | 351/177 X |

FOREIGN PATENT DOCUMENTS 620852  3/1949  United Kingdom ............ 351/160 R

OTHER PUBLICATIONS

Daniel O. Elliott, Jr.—"A Preliminary Report on Use of Gradient Elipsoidal Curves Relative to Fitting of Contact Lenses"—The Optometric Weekly, vol. 55, No. 21, May 21, 1964, pp. 21 & 22.

Primary Examiner—John K. Corbin
Assistant Examiner—Scott J. Sugarman
Attorney, Agent, or Firm—Baldwin, Egan & Fetzer

[57] ABSTRACT

A contact lens is disclosed wherein at least one of its surfaces, generally the posterior surface, is an aspheric surface of revolution which decreases in curvature from its apex to its periphery and which varies in a continuous and regular manner in eccentricity from its apex to its periphery. The novel surface is defined in terms of three parameters: apical radius of curvature; apical eccentricity; and collectively one or more derivatives of eccentricity. The lens with the novel surface posterior is so designed that the novel surface approximates the contour of the cornea while at the same time producing optical properties in the lens for optimal correction of the refractive error of the non-presbyopic eye, and when presbyopia exists, for the correction of the refractive error of the eye and presbyopia.

24 Claims, 9 Drawing Figures

PRIOR ART
U.S. VOLK PATENT #3,482,906

ASPHERIC CONTACT LENS

A new and improved aspheric contact lens made of transparent homogeneous hard plastic lens material and made of transparent homogeneous soft lens material, and of a diameter ranging from 7 to 14 mm, is disclosed wherein one or both of its surfaces, generally the posterior concave surface, is a novel aspheric surface of revolution with an apical umbilical point at which the derivative of curvature vanishes, said novel surface decreasing continuously and regularly in curvature along a meridian from its apex to its peripheral edge, there being three parameters the combination of which define said novel surface: the first parameter being the apical radius of curvature; the second parameter being apical eccentricity; and the third parameter being collectively one or a combination of several preselected derivatives of eccentricity. The apical radius of curvature and apical eccentricity of said novel surface are those of the coaxial osculating conicoid of revolution which osculates the novel surface at its apex, said apex being an umbilical point at which the derivative of curvature vanishes, the instantaneous eccentricity at any given point on said novel surface being quantitatively the same as that of the coaxial conicoid of revolution which osculates said novel surface at the given point and wherein the novel surface and the coaxial osculating conicoid of revolution have, at the given point, a common tangent plane, a common normal to said tangent plane, and identical principal curvatures and principal directions about said common normal. When said novel surface is used as the posterior concave surface of a contact lens, its apical radius of curvature may lie within the range of from 6.0 to 9.2 mm, and its apical eccentricity may lie within the range of from 0.0 to 2.5, and along a meridian section of said novel surface, from its apex to its peripheral edge the change in instantaneous eccentricity resulting from the derivatives of eccentricity may lie within the range of from 0.00 to 2.00 eccentricity units. The apical radius of curvature of the front convex surface of the contact lens of this invention may lie within the range of from 4.5 mm to 15.0 mm and its apical eccentricity may lie within the range of from 0.0 to 2.5 and along a meridian section of said novel surface from its apex to its peripheral edge, the change in instantaneous eccentricity resulting from preselected derivatives of eccentricity may lie within the range of from 0.00 to 2.0 eccentricity units. The novel aspheric lens of this invention is designed to provide a concave posterior aspheric surface of revolution which is substantially of the shape of the front surface of a cornea to which the lens is applied, said back surface of the lens combined with the front surface of the lens provides correction for the refractive error of the eye and correction of presbyopia when it exists.

When the novel surface of the contact lens of this invention is the posterior surface of the lens of this invention, the front convex surface may be spherical, toric, conicoid of revolution, general ellipsoid, or the novel surface. The general ellipsoid has a major, a mean, and a minor axis, each of which may be used as the axis of the front surface, which axis is generally coaxial with the axis of the novel surface, but may be tilted for the purpose of introducing prism into the lens. When the novel surface of the contact lens of this invention is the anterior convex surface, the posterior concave surface may be spherical, toric, conicoid of revolution, or general ellipsoid about its major axis, or the novel surface. The two surfaces may be coaxial or tilted with respect to each other to induce prism into the lens.

BACKGROUND OF THE INVENTION

Heretofore, in the technology of this art, René Descartes, in 1638, published the results of his mathematical investigation of aplanatic surfaces for refraction. These surfaces, first described by Descartes, are known as Cartesian optical surfaces abd meridian sections of the surfaces are known as Cartesian ovals. The Cartesian oval is a curve of 4th degree when the conjugate foci of the Cartesian optical surface are both finite. When one of the conjugate foci is at infinity, the Cartesian oval is a conic whose eccentricity e is equal to the ratio of the indices of refraction of the first and the second refracting medias respectively.

Raoul Fritz and Adrien Fritz were issued British Pat. No. 620,852, Contact Lenses, May 13, 1947. This patent describes a scleral contact lens in which the lens portion forms with the eye an aplanatic system.

George Butterfield was issued U.S. Pat. No. 2,544,246, Corneal Contact Lens, Mar. 6, 1951. This patent describes a contact lens having a spherical concave side with a central spherical optical zone of 5 mm diameter, surrounded by a series of spherical annular zones. FIG. 1 of the drawings of this patent shows all radii of curvature of the posterior concave surface including that of the central 5 mm spherical area, emanating from a single center of curvature located on the axis of the surface.

Noel O. Stimson was issued U.S. Pat. No. 2,653,515, Corneal Contact Lens, Sept. 29, 1953. This invention describes a corneal lens in which the concave posterior surface is toroidal, in which the concavity has a given radius in the horizontal meridian and a different radius, generally smaller, in the vertical meridian. The posterior concavity is provided with one or more discrete areas which extend out from the generally concave contour. The facets or protuberances constitute the only portion of the lens which actually contacts the cornea.

Daniel O. Elliot wrote a paper, "A Preliminary Report on Use of Gradient Ellipsoidal Curves Relative to Fitting of Contact Lenses", The Optometric Weekly, Vol. 55, No. 21, May 21, 1964. The concave surface of this lens has a spherical optical zone and is ground in spherical annular steps.

Charles W. Neefe was issued U.S. Pat. No. 3,187,338, Corneal Contact Lens Of Wide Fitting Range With Sine Curve Concave Surface, June 1, 1965. This patent describes a corneal contact lens having a concave surface of aspherical form from center to edge composed of a sine curve.

David Volk, the present applicant, in U.S. Pat. No. 3,218,765, Lens Generating Method, Nov. 23, 1965, first disclosed has definition of eccentricity as a differential equation, and further defined generalized or effective eccentricity of modified ellipsoids in terms of a Taylor series. Quoting from said patent, column 11, lines 35-46, "In order to give a more exact description of the extended meridian profile of modified ellipsoids, eccentricity may be expressed in the form of a Taylor series. Using MacLaurin's formula, the eccentricity of modified ellipsoid can be written:

$$e_x = df/dx + (d^2f/dx^2)x + \frac{(d^3f/dx^3)x^2}{2!} + \frac{(d^4f/dx^4)x^3}{3!} \cdots, \quad (6)$$

where $e_x$ given by (3) is defined as the generalized or effective eccentricity."

William Feinbloom was issued U.S. Pat. No. 3,227,507, Corneal Contact Lens Having Inner Ellipsoidal Surface, Jan. 4, 1966. The inner concave surface of the contact lenses of the Feinbloom patent has an optic zone area an inscribed sphere of radius $r_o$. The spherical optic zone usually varies from 6 to 7.50 mm in diameter. The zone of inner surface beyond the central spherical optic zone may be an elliptical torus, or toric ellipsoid, or general ellipsoid, or some variation thereof, depending upon grinding and polishing procedures used.

David Volk, in U.S. Pat. No. 3,344,692, Method and Apparatus For Producing Aspheric Contact Lenses, Oct. 3, 1967, described the method and apparatus for producing aspheric contact lenses wich included the production of conicoids of revolution and modified conicoids of revolution having increasing eccentricity peripheralward from the apex of the lens surface and having decreasing eccentricity peripheralward from the apex of the lens surface.

David Volk, in U.S. Pat. No. 3,482,906, Dec. 9, 1969, Aspheric Corneal Contact Lens Series, defines the posterior corneal surfaces of the contact lenses of the lens series disclosed as conicoids of revolution including prolate ellipsoids, paraboloids and hyperboloids of two sheets, and shows the domain of the two parameters which define each lens in the series, apical radius of curvature and eccentricity.

David Volk, in U.S. Pat. No. 3,535,825, Method and Apparatus For Grinding and Polishing Aspheric Surfaces of Revolution, granted Oct. 27, 1970, amplified the concept of generalized or effective eccentricity by defining modified conicoids of revolution as hypereccentric, hypoeccentric and eccentric, and defining a family of isoeccentric surfaces which relates eccentric, hypereccentric and hypoeccentric surfaces.

David Volk, in U.S. Pat. No. 3,950,082, Ophthalmic Lens for Presbyopia and Aphakia, granted Apr. 13, 1976, defines eccentricity of a conic as a differential equation and again defines mathematically generalized or effective eccentricity of a modified conic in the form of a Taylor series.

David Volk, in U.S. Pat. No. 4,149,801, Method and Apparatus For Measuring Aspheric Contact Lens Surfaces, Apr. 17, 1979, describes a method and apparatus for determining eccentricity of conicoid of revolution contact lens surfaces at a given angular inclinations of the optical axis of the contact lens surface with respect to the optical axis of a contact lens measuring microscope. The method consists of measuring the principal radii of curvature about a given normal to the surface at a selected angle of inclination of the optical axis of the conicoid contact lens surface and utilizing the ratio of said two measured principal radii of curvature in a specific equation to determine the eccentricity of the surface.

Figure 1:
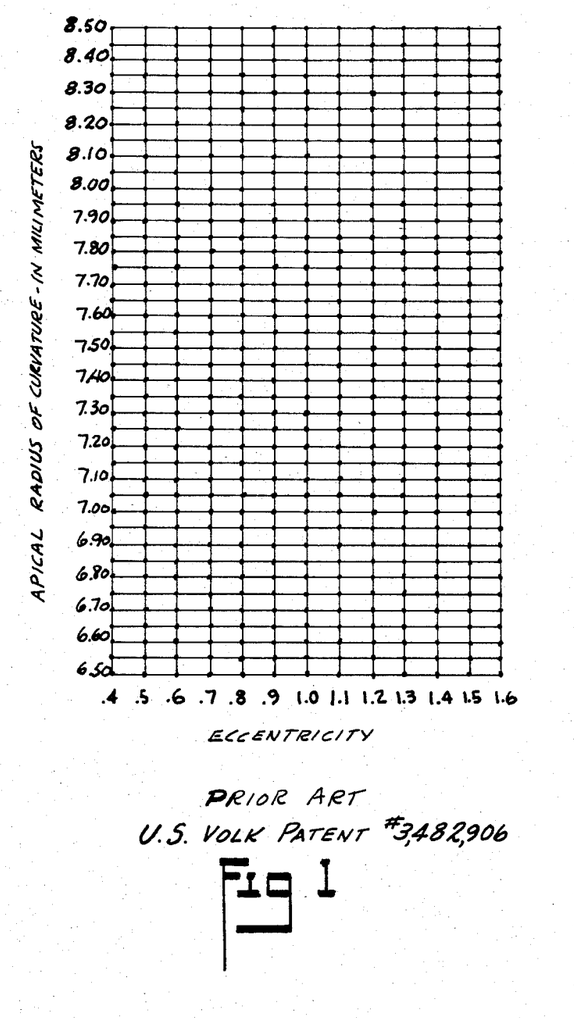
FIG. 1 is a graph illustrating the two-dimensional domain of the two parameters of the prior art aspheric surface of revolution of the lens of the Volk U.S. Pat. No. 3,482,906.
Figure 2:
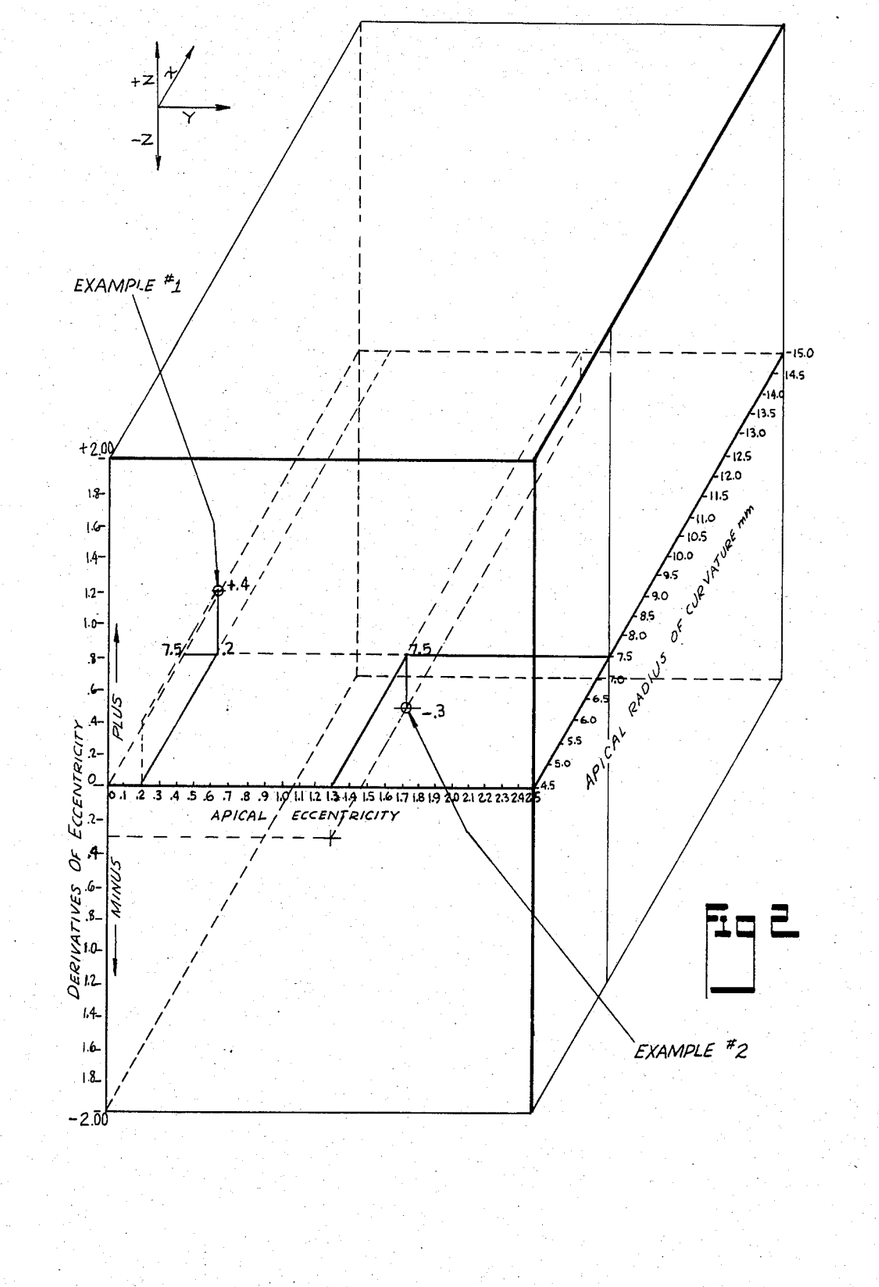
FIG. 2 is a graph of the schematic representation of the three-dimensional domain of the three parameters of the novel aspheric surface of revolution of the lens of this invention.

In my U.S. Pat. No. 3,482,906, Aspheric Corneal Contact Lens Series, the aspheric surface of the contact lens of the invention is a conicoid of revolution as determined by two parameters within a two dimensional domain; apical radii of curvature ranging from 6.50 to 8.50 mm and eccentricity ranging from 0.4 to 1.6, see FIG. 1. The novel surface of the contact lens of this invention distinguishes from the prior art and in particular from the aforedescribed Volk invention of U.S. Pat. No. 3,482,906 by defining the aspheric surface of the lens of the present invention by at least three predetermined parameters: apical radius of curvature; apical eccentricity; and derivatives of eccentricity, i.e. one or more of the first, second, third, etc. derivatives of eccentricity, each derivative being a specific rate of change of eccentricity. Each of the three parameters is represented by a specific number or, when there is more than one derivative of eccentricity, a set of numbers for rates of change of eccentricity, each of which corresponds to a given derivative of eccentricity. FIG. 2 is a schematic representation of the three-dimensional domain or boundry whose coordinates represent the magnitudes of the parameters which define a novel aspheric surface of revolution of a lens of this invention.

DESCRIPTION OF DRAWINGS

FIG. 3 is a drawing of a typical conic and its axis XX', showing the focus F and the directrix LL';

FIG. 6 is a sketch of meridian sections of two lens surfaces, drawn to scale, showing the relationship between the novel aspheric surface of revolution of the lens of this invention and the aspheric surface of revolution of the lens of the Volk U.S. Pat. No. 3,482,906 wherein arc AAA is the meridian section of the novel aspheric surface of revolution of increasing eccentricity of the lens of this invention and arc EAE is the meridian section of the aspheric surface of revolution of Volk U.S. Pat. No. 3,482,906, said two surfaces osculating at point A on common axis of revolution XX';

Eccentricity is a specific mathematical term applied to conics or conicoids of revolution. It defines a specific shape of a conic which is a plane curve, or of a conicoid of revolution which is a solid geometrical figure whose meridian sections are all identical conics. Classically, eccentricity is defined as the ratio of the distance between a given point on the axis of the conic and a point on the conic, to the distance from the point on the conic and a given line perpendicular to the axis of the conic, the ratio being a constant for all pairs of such distances in a given conic. The given point on the axis of the conic is the focus of the conic and the given line perpendicular to the axis of the conic is the directrix of the conic. FIG. 3 is a drawing of a typical conic and its axis XX', showing the focus F of the conic and the directrix LL'. Circular arcs AG and $P_1H$ are drawn with their common center at F. Line segment FA is the axial focal radius while line segments $FP_1$ and $FP_2$ are focal radii and the line segments AD, $P_1D_1$ and $P_2D_2$ are the directrix distances corresponding to said focal radii. Eccentricity, e, a non-dimensional number, is then:

$$e = FA/AD = FP_1/P_1D_1 = FP_2/P_2D_2. \quad (1)$$

This classical equation of e is well known in the art. Mathematically, in order for e to remain a constant for changing focal radii and their corresponding directrix distances, as shown in FIG. 3 and Equation 1, the incremental increases in the lengths of the focal radii with respect to the incremental increases in the corresponding directrix distances must likewise bear the same ratio, so that, from FIG. 3, e can be expressed as follows:

$$e = FP_1/P_1D_1 = (FL_1 + L_1P_1)/(A_1D_1 + P_1A_1) = L_1P_1/P_1A_1, \quad (2)$$

where $FL_1$ equals FA, and $L_1P_1$ is the incremental increase in the focal radius from $L_1$ to $P_1$, and $A_1D_1$ is equal to AD and where $P_1A_1$ is the incremental increase in the directrix distance from $P_1$ to $A_1$, and where:

$$e = FP_2/P_2D_2 = (FL_2 + L_2P_2)/(A_2D_2 + P_2A_2) = (L_2L_2' + L_2'P_2)/(P_2P_2' + P_2'A_2) = L_2'P_2/P_2P_2'. \quad (3)$$

If the incremental increases in the length of the focal radius over the length of the axial focal radius, $L_1P_1$, is designated as $\Delta f$ and the corresponding incremental increase in the length of the directrix distance, $P_1A_1$, is designated as $\Delta x$, then:

$$e = \Delta f / \Delta x \quad (4)$$

which holds true for any corresponding pair of $\Delta f$ and $\Delta x$. Furthermore, if a pair of focal radii, as for example $FP_1$ and $FP_2$, are infinitesimally separated, the incremental difference in lengths of said focal radii is $L_2'P_2$ and the lengths of the corresponding directrix distances is the difference in distance between $P_1D_1$ and $P_2D_2$, or $P_2'P_2$, $\Delta f$ and $\Delta x$ respectively, which will likewise be infinitesimal so that Equation 4 may be written as a differential equation:

$$e = df/dx, \quad (5)$$

which holds true anywhere on a conic or conicoid of revolution. The expressions of eccentricity in the forms shown in Equations 4 and 5 have thus eliminated the need for consideration of a directrix when defining the concept of eccentricity.

The expression of eccentricity as a differential equation, $e = df/dx$, has led me to the conception of novel surfaces of revolution resembling conicoids of revolution, in which "eccentricity" systematically and in a predetermined continuous and regular manner varies continuously and regularly from the apex to the periphery of said surfaces. The novel aspheric surface of revolution of the contact lens of this invention is such a surface of revolution, having an apical umbilical point at which the derivative of curvature vanishes. Since the term eccentricity has always been used mathematically with respect to conics or conicoids of revolution, the application of the term eccentricity to the novel aspheric surface of revolution of the contact lens of this invention requires a redefining of the term eccentricity. As used herein with respect to the novel aspheric surface of revolution of the contact lens of this invention, the eccentricity at a given point on the novel surface, i.e., the instantaneous eccentricity, is that of the coaxial osculating conicoid of revolution which osculates said novel surface at the given point. As used herein, the term osculate is intended to mean that the two surfaces at a given point are in contact and have a common tangent plane, a common normal to the tangent plane at said point, and identical normal principal curvatures about said common normal, said common normal intersecting the common axis of revolution at an angle γ. As thus redefined, the eccentricity of the novel surface of the contact lens of this invention varies continuously and regularly along a meridian section of the surface. Thus the use of the term eccentricity in any description phrase or term with respect to the novel aspheric surface of revolution of the contact lens of this invention is justified when it is understood that the term eccentricity when applied to a given point on said novel surface of varying eccentricity is still fundamentally applied to the coaxial osculating conicoid of revolution which osculates the novel surface at the given point.

Figures 4, 5:
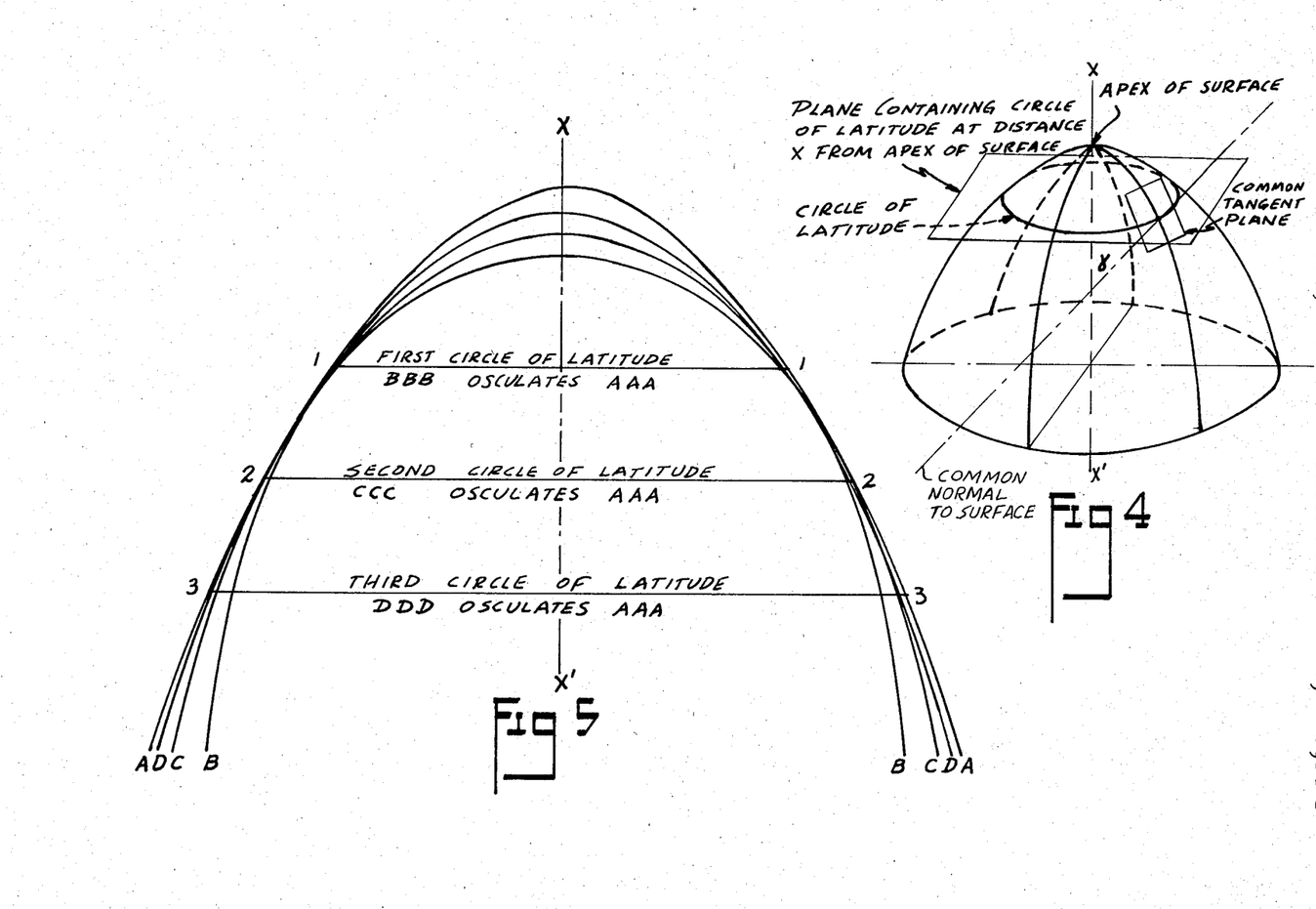
FIG. 4 is a schematic representation of the novel aspheric surface of revolution of the lens of the present invention showing a point on a circle of latitude, a common tangent plane at said point, and a common normal to the tangent plane at said point intersecting axis of revolution XX' at an angle $\gamma$.
FIG. 5 is an exaggerated schematic representation of a meridian section of the novel aspheric surface of revolution of increasing eccentricity of the lens of this invention including the meridian sections of three coaxial osculating conicoids of revolution osculating the novel surface at three circles of latitude.

Furthermore, in the novel aspheric surface of revolution of the lens of this invention, all meridian sections are identical, and a given point along one meridian section has corresponding points along all meridian sections, so that the locus of all such points is a circle of latitude of the surface, the plane containing said circle of latitude being perpendicular to the axis of revolution XX' of the surface as seen in FIG. 4 and at a distance x from the apex of the novel surface along axis XX'. Hence the coaxial osculating conicoid of revolution which osculates the novel surface at a given point will have a common tangent plane with said novel surface not only at said given point but will also have common tangent planes at all other points along the entire circle of latitude containing said point. Hereinafter, the common normal to the tangent plane at a given point of osculation will be simply stated as the normal to the osculating surfaces at the given point, and the two osculating surfaces will be simply stated as tangent to each other at the given circle of latitude at which they osculate.

The above redefinition of eccentricity thus makes it possible to formulate a mathematical expression for defining the varying eccentricity with respect to x of the novel aspheric surface of the lens of this invention as a polynomial series in e for determining the novel surface in terms of coaxial osculating conicoids of revolution whose properties are the second order properties of the novel surface itself:

$$e_x = df/dx + (d^2f/dx^2)x + (d^3f/dx^3)x^2 + (d^4f/dx^4)x^3 \ldots \quad (6)$$

where $e_x$ is hereinafter defined as the instantaneous eccentricity at a given point on the novel surface at a given level x with respect to the apex of said novel surface as the origin, in Cartesian coordinates the axis of revolution being the abscissa or x axis, the ordinate or y axis being perpendicular to the abscissa at the apex of the novel surface, the origin of the Cartesian coordinates, and where df/dx is the apical eccentricity or instantaneous eccentricity at the apex of the novel surface, a predetermined constant ($e_{apex}$ or $e_0$, as also referred to later in specification herein) and where the coefficients of the succeeding terms in said polynomial series, Equation 6, are the preselected first, second, third, etc. derivatives respectively of df/dx and where the focal radius, f, of the novel surface, to said given point at said given level x, is that of the coaxial osculating conicoid of revolution which osculates the novel surface at said given point at said given level x. From the practical standpoint, no more than three derivatives need be utilized to achieve the desired novel surface.

As a first example of the use of the polynomial series in the design of the novel aspheric surface of revolution of the lens of this invention, the effects of only the first derivative of eccentricity will be demonstrated, with the second and third derivatives being zero. Subsequently in the specification, the first, second, and third derivatives of eccentricity will be other than zero and will be used to demonstrate how the novel aspheric surface of the revolution of the lens of this invention can be designed by the use of the addiitonal derivatives. When only the first derivative is used, Equation 6 becomes:

$$e_x = df/dx + (d^2f/dx^2)x, \quad (7)$$

where ($d^2f/dx^2$) may be either a positive value for increasing eccentricity along a meridian section of the novel contact lens surface, from the apex to the periphery of the lens surface, or a negative value for decreasing eccentricity.

In Equations 6 and 7, df/dx is a preselected constant, and is the apical eccentricity, $e_0$, to which the rate of change of eccentricity per unit x, $d^2f/dx^2$, multiplied by the value of x, is added. ($d^2f/dx^2$) is a predetermined value and when multiplied by x, the result is a non-dimensional number.

As a specific first example of a contact lens of this invention, the posterior concave surface of the contact lens is the novel aspheric surface or revolution in which the eccentricity increases along a meridian section from the apex to the periphery. The parameters of said novel surface are: 7.5 mm for the apical radius of curvature, hereinafter specified as $r_{apex}$; 0.2 for the apical eccentricity, hereinafter specified as $e_{apex}$; and +0.4 e units per mm of vertex depth, the first derivative of eccentricity, ($d^2f/dx^2$), hereinafter defined as $rate_1$. Additional derivatives of eccentricity in the polynomial series will be designated as $rate_2$, $rate_3$, etc. Within the three dimensional domain of the parameters of the novel aspheric surface of revolution of the lens of this invention, the parameters of the specific example novel surface are represented by the location of the small circle in FIG. 2 and the parameters are seen as being an apical radius of curvature of 7.5 mm, an apical eccentricity of 0.2 and $rate_1$ as +0.4. Using the values given above for the parameters of the specific example, Equation 7 becomes:

$$e_x = 0.2 + 0.4x \quad (8)$$

The novel aspheric surface of revolution of the contact lens of this invention of continuously and regularly varying eccentricity may be conceived of as formed by a continuum of coaxial osculating conicoids of revolution whose parameters $r_{apex}$ and $e_{apex}$ vary continuously and regularly together, osculating said novel surface in a corresponding continuum of circles of latitude. For analytical purposes, one may conceive of the plane containing successive circles of latitude as separated by the incremental distance dx, where dx is an increment of constant infinitesimal dimension.

If dx is arbitrarily selected to be an extremely small value, $dx = 0.000001$ mm for example, and if the vertex depth of the novel surface measured from the apex is arbitrarily selected to be 1.5 mm, there will be 1,500,000 circles of latitude lying in equally spaced planes perpendicular to the axis of revolution of the novel surface, with the circles of latitude, each numbered n, in sequence from n=1 to n=1,500,000, beginning with the first circle of latitude where n=1 and x=ndx=0.0000010 mm and ending with the last circle of latitude where n=1,500,000 and x=1,500,000·dx=1.5 mm. The apex of the novel surface may be considered a circle of latitude reduced to a point and can be numbered 0. The coaxial conicoid of revolution which osculates the novel surface at its apex can then be considered as part of the continuum of coaxial osculating conicoids of revolution whose osculations at the successive circles of latitude delineate the novel surface. With respect to the first circle of latitude where n=1, the parameters and associated dimensions of the coaxial osculating conicoid of revolution which osculates the novel surface at its apex are utilized as though they are of the preceding circle of latitude.

In the calculations of the coordinates of the novel surface and the parameters and positions along the common axis of each of the sequence of coaxial osculating conicoids of revolution which osculate the novel surface at the corresponding sequence of circles of latitude, systematic errors are reduced to a minimum if the value of dx is very small. I have programmed the calculations for a digital computer having an accuracy of 16 significant digits, and the value of dx utilized in said calculations is 0.000001 mm. A very small value for dx and a large number of significant digits in the numbers used for the calculations increases the accuracy of the results.

In order to facilitate the understanding of what the various factors and symbols represent within the equations and the body of the specification, I have prepared a glossary of the factors and symbols which will be used hereinafter.

GLOSSARY dx: the infinitesimal increment of x by which the value of x is increased in each of the sequence of x values.

n: an integral number used both as a subscript and as a prefix, ranging from 1 to 1,500,000 or more than 1,500,000 in the case of surfaces having greater sagital depth.

$A_0$: the apex of the novel surface and that of the coaxial conicoid of revolution which osculates the novel surface at its apex.

$F_0$: the focus of the novel surface and that of the coaxial osculating conicoid of revolution which osculates the novel surface at its apex.

$r_{ap(0)}$: the apical radius of curvature of the novel surface and that of the coaxial osculating conicoid of revolution which osculates the novel surface at its apex.

$f_{ap(0)}$: the axial focal radius of the novel surface and that of the coaxial oscilating conicoid of revolution which osculates the novel surface at its apex.

$e_0$: the eccentricity of the novel surface at its apex and that of the coaxial osculating conicoid of revolution which osculates said novel surface at its apex.

$e_n$: the eccentricity of the novel surface and that of the coaxial osculating conicoid of revolution which osculates the novel surface at the nth circle of latitude.

$A_n$: the apex of the coaxial osculating conicoid of revolution which osculates the novel surface at the nth circle of latitude.

$F_n$: the focus of the coaxial conicoid of revolution which osculates the novel surface at the nth circle of latitude.

$f_{n(ave)}$: the length of the focal radius from the focus $F_{n-1}$ to the nth circle of latitude.

$df_n$: the incremental increase in the length of the focal radius $f_{n(ave)}$ from the focus $F_{n-1}$ to the nth circle of latitude over the length of the focus radius $f_{n-1}$ from the focus $F_{n-1}$ to the (n−1)th circle of latitude.

$y_n$: the y coordinate of the novel surface at the nth circle of latitude.

$x_n$: the x coordinate of the novel surface at the nth circle of latitude, where $x_n = ndx$.

$C_0$: the center of curvature of the apex of the novel surface and of the coaxial osculating conicoid of revolution which osculates the novel surface at its apex.

$C_n$: the center of curvature of the coaxial osculating conicoid of revolution which osculates the novel surface at the nth circle of latitude.

$\Delta x_n$: the increment of the axial focal radius from the apex $A_n$ of the nth coaxial osculating conicoid of revolution to the plane of the nth circle of latitude of the novel surface.

$s_n$: the distance from the plane of the nth circle of latitude to $C_n$.

$d_n$: the distance from $A_0$ to $C_n$.

$b_n$: the distance from $A_0$ to $A_n$. $b_n$ is a negative value for the novel surfaces which increase in eccentricity from the apex to the periphery and a positive value for the novel surfaces which decrease in eccentricity from the apex to the periphery.

$h_n$: the distance of the focus $F_n$ from the plane of the nth circle of latitude.

$r_{ap(n)}$: the apical radius of curvature of the nth coaxial osculating conicoid of revolution which osculates the novel surface at the nth circle of latitude.

$f_{ap(n)}$: the axial focal radius of the nth coaxial osculating conicoid of revolution which osculates the novel surface at the nth circle of latitude.

$f_n$: the length of the focal radius from $F_n$ to a point in the nth circle of latitude.

$\gamma_n$: the angle which the normal to the novel surface at the point in the nth circle of latitude makes with the axis of revolution, $XX'$, of the novel surface.

$r_{t(n)}$: the transmeridian radius of curvature of the novel surface and that of its coaxial osculating conicoid of revolution which osculates the novel surface at a point in the nth circle of latitude.

$r_{m(n)}$: the meridian radius of curvature of the novel surface and that of its coaxial osculating conicoid of revolution which osculates the novel surface at a point in the nth circle of latitude.

$g_n$: the distance of the focus $F_n$ of the coaxial osculating conicoid of revolution which osculates the novel surface at the nth circle of latitude, from the apex $A_0$ of the novel surface.

The mathematical description of the novel aspheric surface of revolution of the lens of this invention requires a series of calculations by means of a series of equations, to determine the parameters and coordinates of each of the coaxial osculating conicoids of revolution which osculate the novel surface in the sequence of circles of latitude, beginning with the coaxial osculating conicoid of revolution which osculates the novel surface at its apex and proceeding in order through the entire sequence. In these calculations, programmed for and performed by a digital computer, the value of dx is 0.000001 mm and remains constant for all calculations.

The sequence of equations used in the calculations is the following:

The generalized equation for determining the value of the instantaneous eccentricity of the novel aspheric surface of revolution of the lens of this invention and that of the coaxial osculating conicoid of revolution which osculates the novel surface at the nth circle of latitude is a modification of Equation 6 to the following form:

$$e_n e_0 + \text{rate}_1 \cdot ndx + \text{rate}_2 \cdot (ndx)^2 + \text{rate}_3 \cdot (ndx)^3 \ldots, \qquad (9)$$

and for the specific first example where $e_0 = 0.2$, and where rate$_1$ = 0.4, and rate$_2$ and rate$_3$ are zero, $e_n$ at n = 1 is calculated to be 0.20000040000.

The axial focal radius of the coaxial osculating conicoid of revolution which osculates the novel surface at the nth circle of latitude is determined by means of the following generalized equation:

$$f_{ap(n)} = \frac{r_{ap(n)}}{(1 + e_n)}, \qquad (10)$$

and for the coaxial conicoid of revolution which osculates the novel surface at its apex, where n = 0, $f_{ap(0)}$ is calculated to be 6.25 mm.

In a conicoid of revolution, or conic, the mathematical expression $$e = \frac{df}{dx},$$

Equation 5, is applicable at all levels. Rewriting Equation 5 in the following form, df = edx, it can be seen that since e is constant, and dx is a fixed infinitesimal increment, then df will likewise remain a fixed infinitesimal increment throughout the conicoid or conic. This is not true for the novel surface or its meridian section since e varies as a function of x, and df will vary progressively along with the progressive change in e.

In FIG. 3, arc KAK' is a conic and all focal radii have their origin at the focus F. However, in the novel surface with e varying continuously and regularly along a meridian section of the novel surface, a focus F serving as origin of a focal radius to a point in the nth circle of latitude can also be used as the origin of a second "focal radius" to a point in the next succeeding circle of latitude providing the angular separation of the two focal radii is infinitesimal. From the practical standpoint, this is achieved by utilizing a very small value for dx in the calculations. Of the two infinitesimally separated focal radii, the first may be considered that of the coaxial osculating conicoid of revolution which osculates the novel surface at a given circle of latitude, while the second, of increased length, is a function of the average eccentricity of the novel surface between the given circle of latitude and the next successive circle of latitude in the sequence of circles of latitude. The first of the two focal radii will be designated by means of the subscript n−1, as $f_{n-1}$, while the second will be designated by the subscript (n)ave as $f_{n(ave)}$.

For the coaxial osculating conicoid of revolution which osculates the novel surface at the (n−1)th circle of latitude, the incremental increase, $df_n$, in the length of the focal radius $f_{n(ave)}$ extending from the $F_{n-1}$ to the nth circle of latitude, over the length of the focal radius $f_{n-1}$ extending from the focus $F_{n-1}$ to the (n−1)th circle of latitude, is determined by means of a modification of Equation 5, which modification takes into account the fact that the eccentricity of the novel surface varies continuously and regularly from the apex to the periphery. Averaging the eccentricity between consecutive circles of latitude, including the average eccentricity between that of the apex and that of the first circle of latitude, and rewriting Equation 5 to incorporate the average eccentricity, $df_n$ is determined by means of the following equation:

$$df_n = \left( \frac{e_{n-1} + e_n}{2} \right) dx. \tag{11}$$

For the following sequence of calculations utilizing Equations 11 through 26, the parameters of the specific first example are: $r_{apex}=7.50$ mm, $e_{apex}=0.2$ and rate$_1$=0.4, rate$_2$= 0 and rate$_3$=0. Applying the actual parameter values of the specific first example to Equation 11, $df_1$ is calculated to be 0.00000020000 mm.

The generalized equation for the determination of the length $f_{n(ave)}$ is the following:

$$f_{n(ave)} = f_{n-1} + df_n. \tag{12}$$

Applying the actual values of the specific first example to Equation 12, $f_{1(ave)}$ is calculated to be 6.2500002000 mm.

The coordinate $y_n$ of each of the successive circles of latitude is determined by means of the following generalized equation:

$$y_n = [f^2_{n(ave)} - (f_{ap(n-1)} - [\Delta x_{n-1} + dx])^2]^{\frac{1}{2}}. \tag{13}$$

Applying the actual values to Equation 13, where for n=1 and $\Delta x_{n-1}=0$, $y_1$ is calculated to be 0.0038729835 mm.

The generalized equation for the angle $\gamma_n$ which a normal to the novel surface and to the coaxial osculating conicoid of revolution which osculates the novel surface at the nth circle of latitude, makes with the axis of the novel surface is the following:

$$\gamma_n = \tan^{-1} \frac{y_n}{r_{ap(n-1)} + \left[ \left( \frac{e_n + e_{n-1}}{2} \right)^2 - 1 \right] (\Delta x_{n-1} + dx)}. \tag{14}$$

Applying the actual values to Equation 14 where for n=1 and $\Delta x_{n-1}=0$, and where $r_{ap(n-1)}=7.50$ mm, $\gamma_1$ is calculated to be 0.0295874160°.

The generalized equation for determining the length of the transmeridian radius of curvature, $r_{t(n)}$, of the novel surface and of the coaxial osculating conicoid of revolution which osculates the novel surface at the nth circle of latitude is the following:

$$r_{t(n)} = \frac{y_n}{\sin \gamma_n}. \tag{15}$$

Applying the actual values to Equation 15, $r_{t(1)}$ is calculated to be 7.5000000400 mm.

The generalized equation for determining the length of the meridian radius of curvature, $r_{m(n)}$, of the novel surface and of the coaxial osculating conicoid of revolution which osculates the novel surface at the nth circle of latitude is the following:

$$r_{m(n)} = \frac{r_{t(n)}}{1 - e_n^2 \sin^2 \gamma_n}. \tag{16}$$

Applying the actual values to Equation 16, $r_{m(1)}$ is calculated to be 7.5000001200 mm.

The generalized equation for the determination of the apical radius of curvature, $r_{ap(n)}$, of the coaxial osculating conicoid of revolution which osculates the novel surface at the nth circle of latitude is the following:

$$r_{ap(n)} = \left( \frac{r_{t(n)}^3}{r_{m(n)}} \right)^{\frac{1}{2}}. \tag{17}$$

Applying the actual values of Equation 17, $r_{ap(1)}$ is calculated to be 7.5000000000 mm.

The distance $\Delta x_n$ of the apex $A_n$ of the coaxial osculating conicoid of revolution which osculates the novel surface at the nth circle of latitude, from the plane of the nth circle of latitude, is determined by means of the quadratic formula:

$$\Delta x_n = \frac{2r_{ap(n)} - (2r_{ap(n)})^2 - 4(1 - e_n^2)y_n^2)^{\frac{1}{2}}}{2(1 - e_n^2)}. \tag{18}$$

At the first circle of latitude, by means of Equation 18, and applying the actual values to said equation, $\Delta x_1$ is calculated to be 0.0000010000 mm.

When $e_n=1$, the following equation is substituted for Equation 18 for the determination of $\Delta x_n$:

$$\Delta x_n = \frac{y_n^2}{2r_{ap(n)}}. \tag{19}$$

The generalized equation for the determination of the distance $b_n$ between the apex $A_n$ of the coaxial osculating conicoid of revolution which osculates the novel surface at the nth circle of latitude, and the apex $A_0$ of the novel surface is the following:

$$b_n = ndx - \Delta x_n. \quad (20)$$

Applying the actual values to Equation 20, $b_1$ is calculated to be $-0.0000000000$ mm, the negative sign indicating that $A_1$ is external to the convex aspect of the novel surface.

The length of the axial focal radius, $f_{ap(n)}$, of the coaxial osculating conicoid of revolution which osculates the novel surface at the nth circle of latitude is determined by means of Equation 10:

$$f_{ap(n)} = \frac{r_{ap(n)}}{1 + e_n}. \quad (21)$$

Applying the actual values to Equation 21, $f_{ap(1)}$ is calculated to be 6.2499979166 mm.

The distance $h_n$ between the focus $F_n$ of the coaxial osculating conicoid of revolution which osculates the novel surface at the nth circle of latitude from the plane of the nth circle of latitude is determined by means of the following equation:

$$h_n = f_{ap(n)} - \Delta x_n. \quad (22)$$

Applying the actual values to Equation 22, $h_1$ is calculated to be 6.2499969167 mm.

The length of the focal radius, $f_n$, measured from the focus $F_n$ of the coaxial osculating conicoid of revolution which osculates the novel surface at the nth circle of latitude, to the nth circle of latitude, is determined by means of the following equation:

$$f_n = (y_n^2 + h_n^2)^{\frac{1}{2}}. \quad (23)$$

Applying the actual values to Equation 23, $f_1$ is calculated to be 6.2499981167 mm.

The distance $s_n$, along the axis, from the plane of the nth circle of latitude to the center of curvature $C_n$ of the apex $A_n$ of the coaxial osculating conicoid of revolution which osculates the novel surface at the nth circle of latitude, is determined by the following equation:

$$s_n = r_{ap(n)} - \Delta x_n. \quad (24)$$

Applying the actual values to Equation 24, $s_1$ is calculated to be 7.4999989999 mm.

The distance $d_n$ of the center of curvature $C_n$ of the apex $A_n$ of the coaxial osculating conicoid of revolution which osculates the novel surface at the nth circle of latitude, from the apex $A_0$ of the novel surface, is determined by the following equation:

$$d_n = s_n + ndx. \quad (25)$$

Applying the actual values to Equation 25, $d_1$ is calculated to be 7.5000000000 mm.

The distance $g_n$ of the focus $F_n$ of the coaxial osculating conicoid of revolution which osculates the novel surface at the nth circle of latitude, from the apex $A_0$ of the novel surface, is determined by the following equation:

$$g_n = f_{ap(n)} + b_n. \quad (26)$$

Applying the actual values to Equation 26, $g_1$ is calculated to be 6.2499979167 mm.

Thus the parameters of the coaxial osculating conicoid of revolution which osculates the novel surface at the first circle of latitude, of coordinates $x_1$ and $y_1$, and the locations of its apex, its center of curvature of said apex, and its focus, said points defined as cardinal points, with respect to the apex of the novel surface, have all been determined by means of the above sequence of equations and calculations.

The determination of the parameters and the locations of the cardinal points of the coaxial osculating conicoid of revolution which osculates the novel surface at the second circle of latitude of coordinates $2dx$ and $y_2$, proceeds in the same manner and utilizes the same equations as demonstrated for the determination of the parameters and cardinal points of the coaxial osculating conicoid of revolution which osculates the novel surface at the first circle of latitude. The parameters and the location of the cardinal points of the coaxial osculating conicoid of revolution which osculates the novel surface at the first circle of latitude provides the data required for the calculations related to the second circle of latitude.

In the calculations related to the second circle of latitude and the parameters and cardinal points of the coaxial osculating conicoid of revolution which osculates the novel surface at the second circle of latitude, Equations 11 through 26 are utilized, with the coefficients and subscripts n all increased by 1. Thus, in the second set of calculations, n becomes 2 and $n-1$ becomes 1. For example, in Equation 11, $e_{n-1} = 0.2000004$, and in equations 12 and 13, $f_{(n-1)}$, $r_{ap(n-1)}$ and $\Delta x_{(n-1)}$ are those of the coaxial osculating conicoid of revolution which osculates the novel surface at the first circle of latitude and whose values are 6.2499981167 mm, 7.5000000000 mm and 0.0000010000 mm respectively.

At each successive circle of latitude in the sequence of calculations, the value of n is increased by 1 in each of the above equations, Equations 11 through 26.

In Table 1 I have listed the parameters and cardinal points of the coaxial osculating conicoids of revolution which osculate the novel surface of the first example at circles of latitude separated by 0.1 mm, beginning at $n = 100,000$, and the corresponding Cartesian coordinates of the novel surface at each of the listed circles of latitude. Note that as the values of the coordinates x and y increase at the successively distant circles of latitude from the apex of the novel surface, along with the increasing value of the eccentricity of the successive coaxial osculating conicoids of revolution, there is a slight but increasing negative value for the distance between the apex of the novel surface and the apex of each of the successive coaxial osculating conicoids of revolution. Note also that the apical radius of curvature and the axial focal radius of each of the successive coaxial osculating conicoids of revolution, progressively decrease. The data presented in Table 1 is characteristic of the novel surface of the lens of this invention which increases in eccentricity from its apex to its periphery.

FIG. 5, not drawn to scale, is an exaggerated schematic representation of a meridian section of the novel surface of increasing eccentricity of the lens of this invention, and includes the meridian sections of three of the coaxial osculating conicoids of revolution which osculate the novel surface at three circles of latitude. In FIG. 5, XX' is the axis of revolution of the novel surface AAA, and of the coaxial osculating conicoids of revolution BBB, CCC, and DDD, which conicoids of revolution osculate the novel surface at circles of latitude 1-1, 2-2, and 3-3 respectively. With increasing eccentricity of the novel surface and of each of the coaxial osculating conicoids of revolution at successively larger circles of latitude, the apex of each successive conicoid of revolution is further removed from the apex of the novel surface with a corresponding increase in curvature of the apex of each successive conicoid of revolution.

FIG. 6, drawn to scale, demonstrates the difference in contour between a meridian section of the novel aspheric surface of revolution of the contact lens of this invention of increasing eccentricity whose parameters and coordinates are presented in Table 1, and a meridian section of the coaxial osculating conicoid of revolution which osculates the novel aspheric surface of revolution at its apex, and whose parameters are identical to the $r_{apex}$ and $e_{apex}$ of the novel surface. In FIG. 6, XX' is the common axis of revolution of the novel surface whose meridian section is AAA and of the coaxial osculating conicoid of revolution which osculates the novel surface at its apex and whose meridian section is EAE.

As a second example of a contact lens of this invention, the posterior concave surface of the contact lens is the novel surface and the eccentricity decreases along a meridian section from the apex to the periphery. As in the first example, only the first derivative of eccentricity will be utilized. Within the three dimensional domain of the novel aspheric surface of revolution of the lens of this invention, this second example is depicted as a small circle within the boundaries of FIG. 2 at the intersection of the three Cartesian coordinates representing the three parameters defining this surface which are: $r_{apex}=7.50$ mm, $e_{apex}=1.3$ and $rate_1=-0.3$.

In Table 2 I have listed the parameters and cardinal points of the coaxial osculating conicoids of revolution which osculate the novel surface of the second example at circles of latitude separated by 0.1 mm, beginning at $n=100,000$, and have also listed the corresponding Cartesian coordinates of the novel surface at each of the circles of latitude. Note that as the values of the Cartesian coordinates x and y increase at the successively distant circles of latitude from the apex of the novel surface, along with the decreasing value of the eccentricity of the successive coaxial osculating conicoids of revolution, there is a slight but increasing positive value for the distance between the apex of the novel surface and each of the successive coaxial osculating conicoids of revolution. Note also that the apical radius of curvature and the axial focal radius of each of the successive coaxial osculating conicoids of revolution progressively increase.

Figure 7:
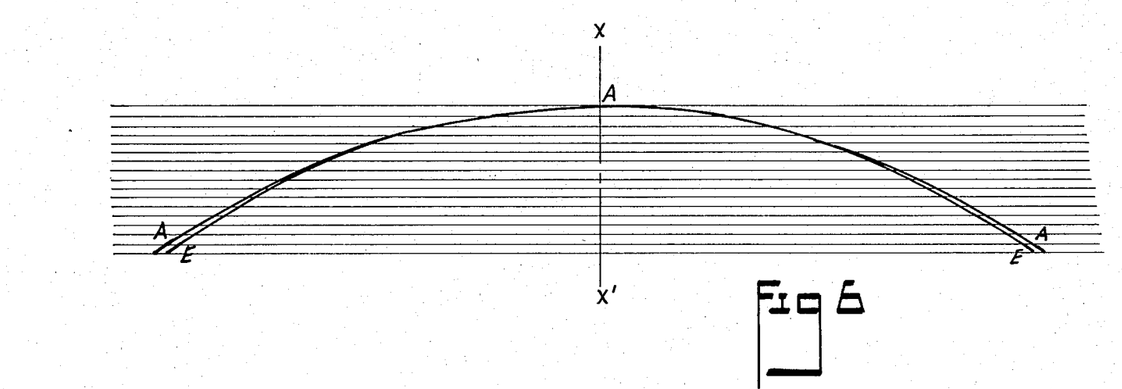
FIG. 7 is an exaggerated schematic representation of a meridian section of the novel aspheric surface of revolution of decreasing eccentricity of the lens of this invention including the meridian section of three coaxial osculating conicoids of revolution osculating the novel surface at three circles of latitude.

FIG. 7, not drawn to scale, is an exaggerated schematic representation of a meridian section of the novel surface of decreasing eccentricity of the lens of this invention, and includes the meridian sections of three of the coaxial osculating conicoids of revolution which osculate the novel surface at three circles of latitude. In FIG. 7, XX' is the axis of revolution of the novel surface AAA, and of the coaxial osculating conicoids of revolution BBB, CCC, and DDD, which conicoids of revolution osculate the novel surface at circles of latitude 1-1, 2-2, and 3-3 respectively. With decreasing eccentricity of the novel surface and of each of the coaxial osculating conicoids of revolution at successively larger circles of latitude, the apex of each successive conicoid of revolution is further removed from the apex of the novel surface with a corresponding decrease in curvature of the apex of each successive conicoid of revolution.

Figure 8:
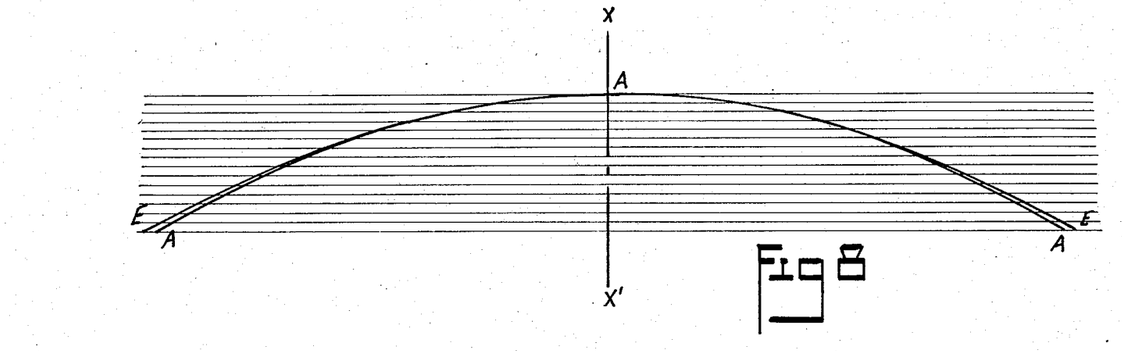
FIG. 8 is a sketch of meridian sections of two lens surfaces, drawn to scale, showing the relationship between the novel aspheric surface of revolution of the lens of this invention and the aspheric surface of revolution of the lens of the Volk U.S. Pat. No. 3,482,906 wherein arc AAA is the meridian section of the novel aspheric surface of revolution of decreasing eccentricity of the lens of this invention and arc EAE is the meridian section of the aspheric surface of revolution of Volk U.S. Pat. No. 3,482,906, said two surfaces osculating at point A on common axis of revolution XX'.

FIG. 8, drawn to scale, demonstrates the difference in contour between a meridian section of the novel aspheric surface of revolution of the contact lens of this invention of decreasing eccentricity whose parameters and coordinates are presented in Table 2, and a meridian section of the coaxial osculating conicoid of revolution which osculates the novel aspheric surface of revolution at its apex, and whose parameters are identical to the $r_{apex}$ and $e_{apex}$ of the novel surface. In FIG. 8, XX' is the common axis of revolution of the novel surface whose meridian section is AAA and of the coaxial osculating conicoid of revolution which osculates the novel surface at its apex and whose meridian section is EAE.

Figure 9:
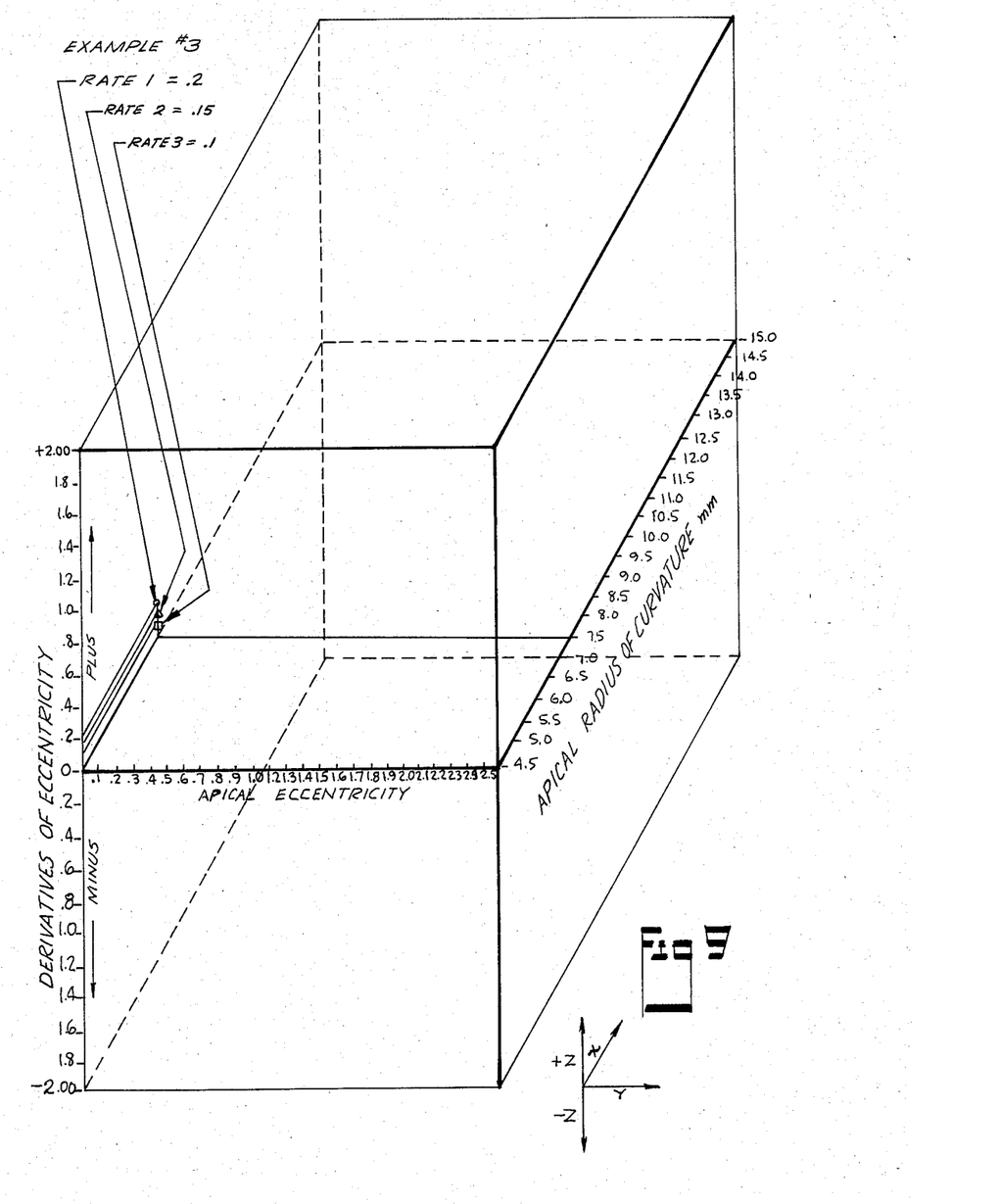
FIG. 9 is a graphic representation similar to FIG. 2 showing the three parameters of another example of the novel surface of the lens of this invention.

As a third example of a contact lens of this invention, the posterior concave surface of the contact lens is the novel surface. The parameters of the novel surface are: $r_{apex}=7.50$ mm, $e_{apex}=0.0$, $rate_1=0.2$, $rate_2=0.15$, and $rate_3=0.1$. $dx=0.000001$ mm. Within the three dimensional domain of the novel aspheric surface of revolution of the lens of this invention, this third example is depicted graphically in FIG. 9. The parameters $r_{apex}$ and $e_{apex}$ are shown as Cartesian coordinates $x=r_{apex}=7.5$ mm (apical radius of curvature) and $y=e_{apex}=0.0$ (apical eccentricity) while the derivatives of eccentricity are shown along a single line extending in the positive z direction from the point of intersection in the x-y plane of coordinates $x=r_{apex}=7.5$ mm and $y=e_{apex}=0.0$, $rate_1$ shown as a circle along said line at $z=0.2$, $rate_2$ shown as a triangle along said line at $z=0.15$, and $rate_3$ shown as a square along said line at $z=0.1$. Applying these parameters of this third example novel surface to Equations 9 through 26 for a total of 1,500,000 calculations, the value of dx being 0.000001 mm, the parameters and cardinal points of the coaxial osculating conicoids of revolution which osculates the novel surface at each of the successive circles of latitude are determined.

In Table 3, I have listed the parameters and cardinal points of the coaxial osculating conicoids of revolution which osculate the novel surface of the third example at circles of latitude separated by 0.1 mm, beginning at $n=100,000$, and have also listed the corresponding Cartesian coordinates of the novel surface at each of the circles of latitude.

In general, it is desirable for the novel surface to have a small rate of change in eccentricity in the vicinity of the apex of the surface and to have an accelerating increase in the rate of change in eccentricity with increasing distance from the apex. In general, where $e_{apex}$ is a small value within the range from 0.000 to 2.500, a value of 0.300 for example, it is desirable for e to increase with increasing x, and where $e_{apex}$ is a large value within the range, a value of 1.350 for example, it is desirable for e to decrease with increasing x.

The usefulness of the novel surface as the posterior surface of the lens of this invention depends upon the fact that substantially constant eccentricities may be achieved in the apical area of the novel surface while the peripheral area changes relatively rapidly in eccentricity to enable the novel surface to conform to the complimentary part of the cornea. When it is desirable to have a substantially constant power of the contact lens in front of the pupil of the eye, as is desirable for the correction of the refractive error of the non-presbyopic eye, the apical eccentricity should be a small value, generally less than 0.300, and should increase slowly to the edge of the central part of the novel surface which is an area of about 3.5 mm in diameter. Beyond said central area, the eccentricity changes more rapidly and the rate of change increases with increasing distance from the apex of the novel surface, so that the contour of the novel back surface of the lens of this invention approximately matches the contour of the cornea to which the lens is applied.

When it is desirable to have a rapidly increasing refractive power of the contact lens in the area of the lens in front of the pupil of the eye, as is desirable for the correction of the presbyopic or aphakic eye, said increase being in a radial direction from the apex of the novel surface, the apical eccentricity should be a relatively high value, 1.000 or greater, and the eccentricity should change very little from its apical value to the edge of the central area, which is about 3.5 mm in a diameter, and should then decrease in an accelerated manner to the periphery of the novel surface so that the contour of the novel surface of the lens of this invention approximately matches the contour of the cornea to which it is applied.

The concept of a contact lens having a surface of revolution of predetermined continuously and regularly varying eccentricity from the apex of the surface to its periphery within a given domain is new in the art. The theoretical mathematical-geometrical basis of such a surface, also new in the art, is that it represents a continuum of continuously and regularly changing, mathematically definable, coaxial conicoids of revolution which osculate the novel surface in a corresponding continuum of circles of latitude of said novel surface, all points in a specific circle of latitude being identical elliptic points, corresponding to the identical elliptic points of the coaxial osculating conicoid of revolution at said specific circle of latitude, there being a specific apical radius of curvature, r, and a specific eccentricity, e, of each osculating conicoid of revolution in said continuum, the eccentricity of the coaxial osculating conicoid of revolution for a given circle of latitude being exactly the instantaneous eccentricity of the novel surface at that circle of latitude.

The novel aspheric surface of revolution of the lens of this invention can be accurately produced by a numerically controlled lathe with a cutting tool having a fine steel or diamond cutting point, the cutting point passing through a series of points having the x and y coordinates calculated for the surface, as the lens rotates about its axis of revolution. The cutting tool point may move linearly from point to point on the surface or may move in small arcs from point to point, using circular interpolation to locate the center of curvature for each small arcuate movement of the cutting point of the tool. Since the point to point movements of the cutting tool point may be very small, linear motion of the cutting tool point is quite satisfactory.

The polishing of the novel surface of the contact lens of this invention when concave is accomplished by means of the method and apparatus described in my U.S. Pat. No. 3,535,825, "Method and Apparatus For Grinding and Polishing Aspheric Surfaces of Revolution", and when convex, is accomplished by means of a soft conforming polishing pad.

The measurement of the instantaneous eccentricity about a normal to the novel aspheric surface of revolution of varying eccentricity of the contact lens of this invention is accomplished by means of my invention U.S. Pat. No. 4,149,801, "Method and Apparatus For Measuring Aspheric Contact Lens Surfaces". The apparatus consists of a measuring microscope having a lens mount which provides means for tilting the axis of the novel surface about an axis perpendicular to both the microscope optical axis and the optical axis of said novel surface as well as means for translational movement of the lens, to cause said normal to the novel surface to coincide with said microscope optical axis for measurement of the principal normal radii of curvature, $r_{meridian}$, $r_m$, and $r_{transmeridian}$, $r_t$, when said optical axis and said novel surface axis are inclined an angle $\gamma$ with respect to each other. The instantaneous eccentricity is then determined by means of the following equation:

$$e = \frac{(1 - r_t/r_m)^{\frac{1}{2}}}{\sin\gamma}. \tag{27}$$

TABLE 1

| n | $x_n$ | $y_n$ | $e_n$ | $f_{ap(n)}$ | $b_n$ | $r_{ap(n)}$ | $d_n$ | $\gamma_n$ | $r_{t(n)}$ | $r_{m(n)}$ |
|---|---|---|---|---|---|---|---|---|---|---|
| 100,000 | .1 | 1.2208544 | .24 | 6.0480215 | −0.0000000 | 7.4995467 | 7.4995467 | 9.3616930 | 7.5052683 | 7.5167247 |
| 200,000 | .2 | 1.7211408 | .28 | 5.8577917 | −0.0000000 | 7.4979734 | 7.4979733 | 13.2426069 | 7.5134447 | 7.5444831 |
| 300,000 | .3 | 2.1014739 | .32 | 5.6780000 | −0.0000000 | 7.4949600 | 7.4949600 | 16.2162299 | 7.5250677 | 7.5856464 |
| 400,000 | .4 | 2.4192739 | .36 | 5.5074902 | −0.0000001 | 7.4901867 | 7.4901866 | 18.7131789 | 7.5406519 | 7.6426046 |
| 500,000 | .5 | 2.6969120 | .40 | 5.3452381 | −0.0000001 | 7.4833334 | 7.4833333 | 20.8977852 | 7.5606886 | 7.7178061 |
| 600,000 | .6 | 2.9459452 | .44 | 5.1903334 | −0.0000001 | 7.4740800 | 7.4740799 | 22.8523531 | 7.5856475 | 7.8138035 |
| 700,000 | .7 | 3.1733022 | .48 | 5.0419640 | −0.0000001 | 7.4621067 | 7.4621066 | 24.6241334 | 7.6159785 | 7.9333064 |
| 800,000 | .8 | 3.3835495 | .52 | 4.8994035 | −0.0000001 | 7.4470934 | 7.4470932 | 26.2425352 | 7.6521140 | 8.0792435 |
| 900,000 | .9 | 3.5799042 | .56 | 4.7620000 | −0.0000001 | 7.4287200 | 7.4287199 | 27.7268336 | 7.6944713 | 8.2548346 |
| 1,000,000 | 1.0 | 3.7647491 | .60 | 4.6291667 | −0.0000002 | 7.4066667 | 7.4066665 | 29.0901114 | 7.7434561 | 8.4636738 |
| 1,100,000 | 1.1 | 3.9399197 | .64 | 4.5003740 | −0.0000002 | 7.3806133 | 7.3806132 | 30.3414770 | 7.7994654 | 8.7098285 |
| 1,200,000 | 1.2 | 4.1068765 | .68 | 4.3751428 | −0.0000002 | 7.3502400 | 7.3502398 | 31.4874089 | 7.8628918 | 8.9979558 |
| 1,300,000 | 1.3 | 4.2668124 | .72 | 4.2530387 | −0.0000002 | 7.3152266 | 7.3152264 | 32.5326192 | 7.9341269 | 9.3334424 |
| 1,400,000 | 1.4 | 4.4207248 | .76 | 4.1336666 | −0.0000002 | 7.2752533 | 7.2752531 | 33.4806357 | 8.0135658 | 9.7225723 |
| 1,500,000 | 1.5 | 4.5694642 | .80 | 4.0166666 | −0.0000002 | 7.2299999 | 7.2299997 | 34.3342088 | 8.1016110 | 10.1727313 |

TABLE 2

| n | $x_n$ | $y_n$ | $e_n$ | $f_{ap(n)}$ | $b_n$ | $r_{ap(n)}$ | $d_n$ | $\gamma_n$ | $r_{t(n)}$ | $r_{m(n)}$ |
|---|---|---|---|---|---|---|---|---|---|---|
| 100,000 | .1 | 1.2274009 | 1.27 | 3.3048106 | 0.0000000 | 7.5019200 | 7.5019200 | 9.2179230 | 7.6621576 | 7.9929736 |
| 200,000 | .2 | 1.7391170 | 1.24 | 3.3515893 | 0.0000000 | 7.5075600 | 7.5075601 | 12.8644696 | 7.8111441 | 8.4556367 |
| 300,000 | .3 | 2.1334978 | 1.21 | 3.4012398 | 0.0000000 | 7.5167401 | 7.5167401 | 15.5716175 | 7.9476846 | 8.8851099 |

TABLE 2-continued

| n | $x_n$ | $y_n$ | $e_n$ | $f_{ap(n)}$ | $b_n$ | $r_{ap(n)}$ | $d_n$ | $\gamma_n$ | $r_{t(n)}$ | $r_{m(n)}$ |
|---|---|---|---|---|---|---|---|---|---|---|
| 400,000 | .4 | 2.4670240 | 1.18 | 3.4537982 | 0.0000000 | 7.5292801 | 7.5292801 | 17.7948787 | 8.0724528 | 9.2791808 |
| 500,000 | .5 | 2.7614533 | 1.15 | 3.5093024 | 0.0000000 | 7.5450001 | 7.5450001 | 19.7146035 | 8.1860806 | 9.6362829 |
| 600,000 | .6 | 3.0278784 | 1.12 | 3.5677925 | 0.0000000 | 7.5637201 | 7.5637202 | 21.4249040 | 8.2891653 | 9.9554637 |
| 700,000 | .7 | 3.2728477 | 1.09 | 3.6293111 | 0.0000001 | 7.5852601 | 7.5852602 | 22.9824142 | 8.3822755 | 10.2363432 |
| 800,000 | .8 | 3.5006010 | 1.06 | 3.6939030 | 0.0000001 | 7.6094402 | 7.6094402 | 24.4243554 | 8.4659557 | 10.4790659 |
| 900,000 | .9 | 3.7140641 | 1.03 | 3.7616158 | 0.0000001 | 7.6360802 | 7.6360802 | 25.7767002 | 8.5407297 | 10.6842483 |
| 1,000,000 | 1.0 | 3.9153543 | 1.00 | 3.8325001 | 0.0000001 | 7.6650002 | 7.6650003 | 27.0583717 | 8.6071033 | 10.8529226 |
| 1,100,000 | 1.1 | 4.1060604 | 0.97 | 3.9066092 | 0.0000001 | 7.6960202 | 7.6960203 | 28.2836092 | 8.6655668 | 10.9864791 |
| 1,200,000 | 1.2 | 4.2874103 | 0.94 | 3.9840001 | 0.0000001 | 7.7289602 | 7.7289603 | 29.4633962 | 8.7165969 | 11.0866093 |
| 1,300,000 | 1.3 | 4.4603758 | 0.91 | 4.0647331 | 0.0000001 | 7.7636402 | 7.7636403 | 30.6063681 | 8.7606574 | 11.1552497 |
| 1,400,000 | 1.4 | 4.6257418 | 0.88 | 4.1488724 | 0.0000001 | 7.7998802 | 7.7998803 | 31.7194144 | 8.7982012 | 11.1945285 |
| 1,500,000 | 1.5 | 4.7841534 | 0.85 | 4.2364866 | 0.0000001 | 7.8375002 | 7.8375003 | 32.8080925 | 8.8296704 | 11.2067154 |

TABLE 3

| n | $x_n$ | $y_n$ | $e_n$ | $f_{ap(n)}$ | $b_n$ | $r_{ap(n)}$ | $d_n$ | $\gamma_n$ | $r_{t(n)}$ | $r_{m(n)}$ |
|---|---|---|---|---|---|---|---|---|---|---|
| 100,000 | .1 | 1.2206562 | 0.02160 | 7.3414097 | −0.0000000 | 7.4999842 | 7.4999842 | 9.3667552 | 7.5000305 | 7.5001232 |
| 200,000 | .2 | 1.7204730 | 0.04680 | 7.1645477 | −0.0000000 | 7.4998485 | 7.4998485 | 13.2610318 | 7.5002807 | 7.5011452 |
| 300,000 | .3 | 2.1000370 | 0.07620 | 6.9683953 | −0.0000000 | 7.4993870 | 7.4993869 | 16.2580606 | 7.5010941 | 7.5045094 |
| 400,000 | .4 | 2.4167242 | 0.11040 | 6.7527526 | −0.0000001 | 7.4982565 | 7.4982564 | 18.7900299 | 7.5030018 | 7.5125014 |
| 500,000 | .5 | 2.6928689 | 0.15000 | 6.5181888 | −0.0000001 | 7.4959171 | 7.4959170 | 21.0218710 | 7.5067924 | 7.5285905 |
| 600,000 | .6 | 2.9400073 | 0.19560 | 6.2659392 | −0.0000001 | 7.4915569 | 7.4915568 | 23.0348916 | 7.5135960 | 7.5578689 |
| 700,000 | .7 | 3.1650733 | 0.24780 | 5.9977554 | −0.0000001 | 7.4839992 | 7.4839991 | 24.8730192 | 7.5249836 | 7.6076270 |
| 800,000 | .8 | 3.3726760 | 0.30720 | 5.7157205 | −0.0000001 | 7.4715898 | 7.4715897 | 26.1019261 | 7.5430849 | 7.6881338 |
| 900,000 | .9 | 3.5661264 | 0.37440 | 5.4220480 | −0.0000002 | 7.4520627 | 7.4520626 | 28.1019261 | 7.5707255 | 7.8137498 |
| 1,000,000 | 1.0 | 2.7479681 | 0.45000 | 5.1188835 | −0.0000002 | 7.4123810 | 7.4223808 | 29.4986279 | 7.6115906 | 8.0046025 |
| 1,100,000 | 1.1 | 3.9202847 | 0.53460 | 4.8081273 | −0.0000002 | 7.2785522 | 7.3785520 | 30.7365443 | 7.6704201 | 8.2892481 |
| 1,200,000 | 1.2 | 4.0848941 | 0.62880 | 4.4912910 | −0.0000003 | 7.3154147 | 7.3154145 | 31.7936812 | 7.7532511 | 8.7091074 |
| 1,300,000 | 1.3 | 4.2434823 | 0.73320 | 4.1693941 | −0.0000003 | 7.2263938 | 7.2263935 | 32.6396172 | 7.8677244 | 9.3261880 |
| 1,400,000 | 1.4 | 4.3977049 | 0.84840 | 3.8429045 | −0.0000004 | 7.1032248 | 7.1032244 | 33.2370555 | 8.0234817 | 10.2371127 |
| 1,500,000 | 1.5 | 4.5492677 | 0.97500 | 3.5117172 | −0.0000004 | 6.9356414 | 6.9356410 | 33.5446132 | 8.2326849 | 11.5998193 |

What is claimed is:

1. A contact lens made of transparent homogeneous optical material and of a diameter between 7 and 14 mm to fit the human eye, having at least one of its surfaces a novel aspheric surface of revolution with an apical unbilical point at which the derivative of curvature vanishes and wherein said surface decreases continuously and regularly in curvature along a meridian from its apex to its peripheral edge and wherein said surface varies continuously and regularly in eccentricity from its apex to its periphery.

2. A contact lens as in claim 1, wherein the novel surface is defined by three parameters; the apical radius of curvature, $r_{apex}$; the apical eccentricity, $e_{apex}$; and collectively one or more derivatives of eccentricity.

3. A contact lens as in claim 1, wherein the instantaneous eccentricity of the novel surface at any given point on the surface is a function of the apical eccentricity of said novel surface and the derivatives of eccentricity in the form of a polynomial series in e:

$$e_x = df/dx + (d^2f/dx^2)x + (d^3f/dx^3)x^2 + d^4f/dx^4)x^3 \ldots$$

where $e_x$ is the instantaneous eccentricity at the given level x and the eccentricity of the coaxial osculating conicoid of revolution which osculates the novel surface at the level x; where df/dx at the apex of the novel surface is the apical eccentricity and the eccentricity of the coaxial osculating conicoid of revolution which osculates the novel surface at its apex; where the focal radius f of said novel surface to said given point at said level x is that of the coaxial osculating conicoid of revolution which osculates the novel surface at said given point at said level x; and where $d^2f/dx^2$, $d^3f/dx^3$, and $d^4f/dx^4$ are the first, second and third derivatives of df/dx respectively.

4. A contact lens as in claim 1, wherein the novel surface is the posterior surface of the lens.

5. A contact lens as in claim 1, wherein the novel aspheric surface is the anterior surface of the lens.

6. A contact lens as in claim 1, wherein the novel surface is both anterior and posterior surfaces of the lens.

7. A contact lens as a claim 1, wherein the novel surface is the posterior surface of the lens and a spherical surface is the anterior surface of the lens.

8. A contact lens as in claim 1, wherein the novel surface is the posterior surface of the lens and a toric surface is the anterior surface of the lens.

9. A contact lens as in claim 1, wherein the novel surface is the posterior surface of the lens and a conicoid of revolution which decreases in curvature from its apex to its periphery is the anterior surface of the lens.

10. A contact lens as in claim 1, wherein the novel surface is the posterior surface of the lens and a conicoid of revolution which increases in curvature from its apex to its periphery is the anterior surface.

11. A contact lens as in claim 1, wherein the novel surface is the posterior surface of the lens and the anterior surface is a general ellipsoid having two elliptical principal meridian sections, each of which decreases in curvature from its apex to its periphery.

12. A contact lens as in claim 1, wherein the novel surface is the posterior surface of the lens and the anterior surface is a general ellipsoid having two elliptical principal meridian sections, each of which increases in curvature from its apex to its periphery.

13. A contact lens as in claim 1, wherein the novel surface is the posterior surface of the lens and the anterior surface is a general ellipsoid having two elliptical principal meridian sections, one of said principal meridian sections increasing in curvature from its apex to its periphery and the other of said principal meridian sections decreasing in curvature from its apex to its periphery.

14. A contact lens as in claim 1, wherein the novel surface is the anterior surface of the lens and a spherical surface is the posterior surface of the lens.

15. A contact lens as in claim 1, wherein the novel surface is the anterior surface of the lens and a toric surface is the posterior surface of the lens.

16. A contact lens as in claim 1, wherein the novel surface in the anterior surface of the lens and a conicoid of revolution which decreases in curvature from its apex to its periphery is the posterior surface of the lens.

17. A contact lens as in claim 1, wherein the novel surface is the anterior surface of the lens and the posterior surface is a general ellipsoid having two elliptical principal meridian sections, each of which decreases in curvature from its apex to its peripheral edge.

18. A contact lens as in claim 1, wherein the novel surface has an increasing eccentricity from its apex to its periphery.

19. A contact lens as in claim 1, wherein the novel surface has a decreasing eccentricity from its apex to its periphery.

20. A contact lens as in claim 1, wherein the novel surface is concave with the apical eccentricity ranging from 0.0 to 2.5 eccentricity units with the apical radius of curvature ranging from 6.0 to 9.2 mm and with the change in eccentricity from the apex of the novel surface to its periphery lying within the range from +2.0 to −2.0 eccentricity units.

21. A contact lens as in claim 1, wherein the novel surface is convex with the apical eccentricity ranging from 0.0 to 2.5 eccentricity units with the apical radius of curvature ranging from 4.5 to 15.0 mm and with the change in eccentricity from the apex of the novel surface to its periphery lying within the range from +2.0 to −2.0 eccentricity units.

22. A semi-finished contact lens made of transparent homogeneous optical material and of a diameter between 7 and 14 mm and of a minimum thickness of 1.5 mm, with the novel aspheric surface of revolution of the lens of this invention being the finished surface which has an apical umbilical point at which the derivative of curvature vanishes and wherein said surface decreases continuously and regularly in curvature along a meridian from its apex to its peripheral edge and wherein said surface varies continuously and regularly in eccentricity from its apex to its periphery, with the second surface being substantially plane.

23. A semi-finished contact lens as in claim 22, wherein the posterior concave surface is finished and is the novel surface.

24. A semi-finished contact lens as in claim 22, wherein the anterior convex surface is finished and is the novel surface.

* * * * *